United States Patent
Tseng et al.

(10) Patent No.: US 12,306,926 B2
(45) Date of Patent: May 20, 2025

(54) DYNAMIC COMMAND PROTECTION METHOD AND DYNAMIC COMMAND PROTECTION SYSTEM BY USING TIME-VARY SALT DATA

(71) Applicant: MEDIATEK INC., Hsin-Chu (TW)

(72) Inventors: Hui-Chi Tseng, Hsinchu (TW); He-Kai Yang, Hsinchu (TW); Sheng-Kai Lin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 261 days.

(21) Appl. No.: 18/071,661

(22) Filed: Nov. 30, 2022

(65) Prior Publication Data

US 2024/0176860 A1 May 30, 2024

(51) Int. Cl.
*G06F 21/60* (2013.01)
*G06F 21/44* (2013.01)
*G06F 21/64* (2013.01)

(52) U.S. Cl.
CPC ............ *G06F 21/44* (2013.01); *G06F 21/606* (2013.01); *G06F 21/64* (2013.01)

(58) Field of Classification Search
CPC ........ G06F 21/44; G06F 21/606; G06F 21/64; G06F 21/60
See application file for complete search history.

(56) References Cited

U.S. PATENT DOCUMENTS

| | | | |
|---|---|---|---|
| 2016/0359820 A1* | 12/2016 | Bender | H04W 12/04 |
| 2019/0222427 A1* | 7/2019 | Chen | G06F 21/10 |
| 2020/0382305 A1 | 12/2020 | Wimberley | |
| 2021/0117108 A1* | 4/2021 | Brown | G06F 3/0622 |
| 2023/0179418 A1* | 6/2023 | Noh | H04L 9/0861 713/168 |
| 2023/0367489 A1* | 11/2023 | Dover | H04L 9/3239 |

FOREIGN PATENT DOCUMENTS

| | | |
|---|---|---|
| CN | 108737104 A | 11/2018 |
| CN | 109639436 A | 4/2019 |
| TW | 202145033 A | 12/2021 |

* cited by examiner

*Primary Examiner* — Shirley X Zhang
(74) *Attorney, Agent, or Firm* — Winston Hsu

(57) ABSTRACT

A dynamic command protection method includes generating salt data by a physically linked device after an authentication of the physically linked device is verified, transmitting the salt data from the physically linked device to a computer terminal, transmitting at least one command protected by the salt data during a first time interval from the computer terminal to the physically linked device, verifying the salt data if the at least one command is valid, executing at least one valid command after the salt data is successfully verified, and updating the salt data after the first time interval elapses. The salt data is bound to the physically linked device and is generated according to a time-varying value.

16 Claims, 8 Drawing Sheets

DYNAMIC COMMAND PROTECTION METHOD AND DYNAMIC COMMAND PROTECTION SYSTEM BY USING TIME-VARY SALT DATA

BACKGROUND

With the development of technology, information security and data leakage protection mechanism are important issues. For manufacturers, once fake commands are received from a host to a physically linked device, the fake commands may invade a core program of the physically linked device. Unfortunately, when the fake commands control the core program, the physically linked device suffers from a great security risk, such as a confidential data leakage risk or a system crash risk.

To reduce the security risk, some conventional methods are currently adopted. In a first method, the physically linked device can install an application program for verifying if the received commands are valid. In a second method, the physically linked device can use a checksum mechanism for verifying if the received commands are valid. In a third method, the command can be packed and encoded as a specific format packet. However, although current methods can verify the received commands, if the commands are recorded by hackers, the current methods would still fail.

Therefore, to develop a command protection method capable of providing a robust protection function to block various fake commands is an important issue.

SUMMARY

In an embodiment of the present disclosure, a dynamic command protection method is disclosed. The dynamic command protection method comprises generating salt data by a physically linked device after an authentication of the physically linked device is verified, transmitting the salt data from the physically linked device to a computer terminal, transmitting at least one command protected by the salt data during a first time interval from the computer terminal to the physically linked device, verifying the salt data if the at least one command is valid, executing at least one valid command after the salt data is successfully verified, and updating the salt data after the first time interval elapses. The salt data is bound to the physically linked device and is generated according to a time-varying value.

In another embodiment of the present disclosure, a dynamic command protection system is disclosed. The dynamic command protection system comprises a physically linked device and a computer terminal. The computer terminal is linked to the physically linked device. The physically linked device generates salt data after an authentication of the physically linked device is verified. The physically linked device transmits the salt data to the computer terminal. The computer terminal transmits at least one command protected by the salt data to the physically linked device during a first time interval. The physically linked device verifies the salt data if the at least one command is valid. The physically linked device executes at least one valid command after the salt data is successfully verified. The physically linked device updates the salt data after the first time interval elapses. The salt data is bound to the physically linked device and is generated according to a time-varying value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
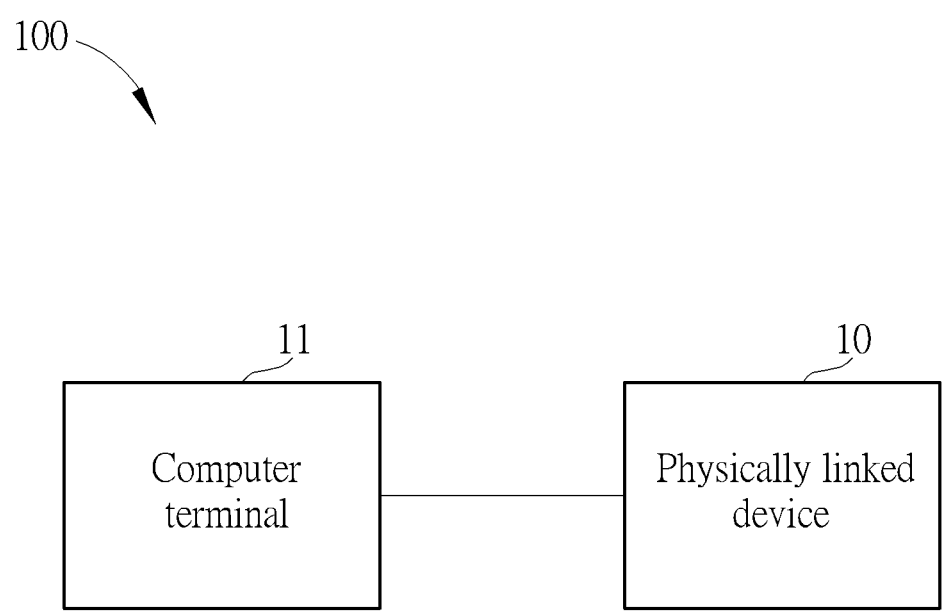
FIG. 1 is a block diagram of a dynamic command protection system according to an embodiment of the present invention.

FIG. 1 is a block diagram of a dynamic command protection system 100 according to an embodiment of the present invention. The dynamic command protection system 100 can be used for various applications, such as a serial link authentication (SLA) mechanism, a download agent authentication (DAA) mechanism, or a secure boot check (SBC). However, the dynamic command protection system 100 is not limited to applying to aforementioned applications. The dynamic command protection system 100 includes a physically linked device 10 and a computer terminal 11. The physically linked device 10 can be a smartphone, a tablet, or any communication device. The computer terminal 11 can be a personal computer, a notebook, or a workstation. The computer terminal 11 is linked to the physically linked device 10. Here, the physically linked device 10 is capable of providing a physically linked port for communicating with the computer terminal 11, such as a Universal Serial Bus (USB) port or a Peripheral Component Interconnect Express (PCIE) port. In the dynamic command protection system 100, the physically linked device 10 can generate salt data after an authentication of the physically linked device is verified. Then, the physically linked device 10 can transmit the salt data to the computer terminal 11. The computer terminal 11 can transmit at least one command protected by the salt data to the physically linked device 10 during a first time interval. The physically linked device 10 can verify the salt data if the at least one command is valid. The physically linked device 10 can execute at least one valid command after the salt data is successfully verified. The physically linked device 10 can update the salt data after the first time interval elapses. The salt data is bound to the physically linked device 10 and is generated according to a time-varying value. In the dynamic command protection system 100, the "salt data" can be defined as a key for protecting commands, such as a scrambling seed. Further, the salt data is bound to the physically linked device 10 having a unique identification code (i.e., a hardware ID). Further, the salt data can be generated by an output of a runtime counter of the physically linked device 10. In other words, the time-varying value of the salt data is time-variant. Therefore, different physically linked devices 10 have different salt data. Further, different time sessions of the physically linked device 10 have different salt data. Therefore, since the salt data is varied over time, the dynamic command protection system 100 can provide a robust protection function for blocking various fake commands. Details of a dynamic command protection method are illustrated below.

Figure 2:
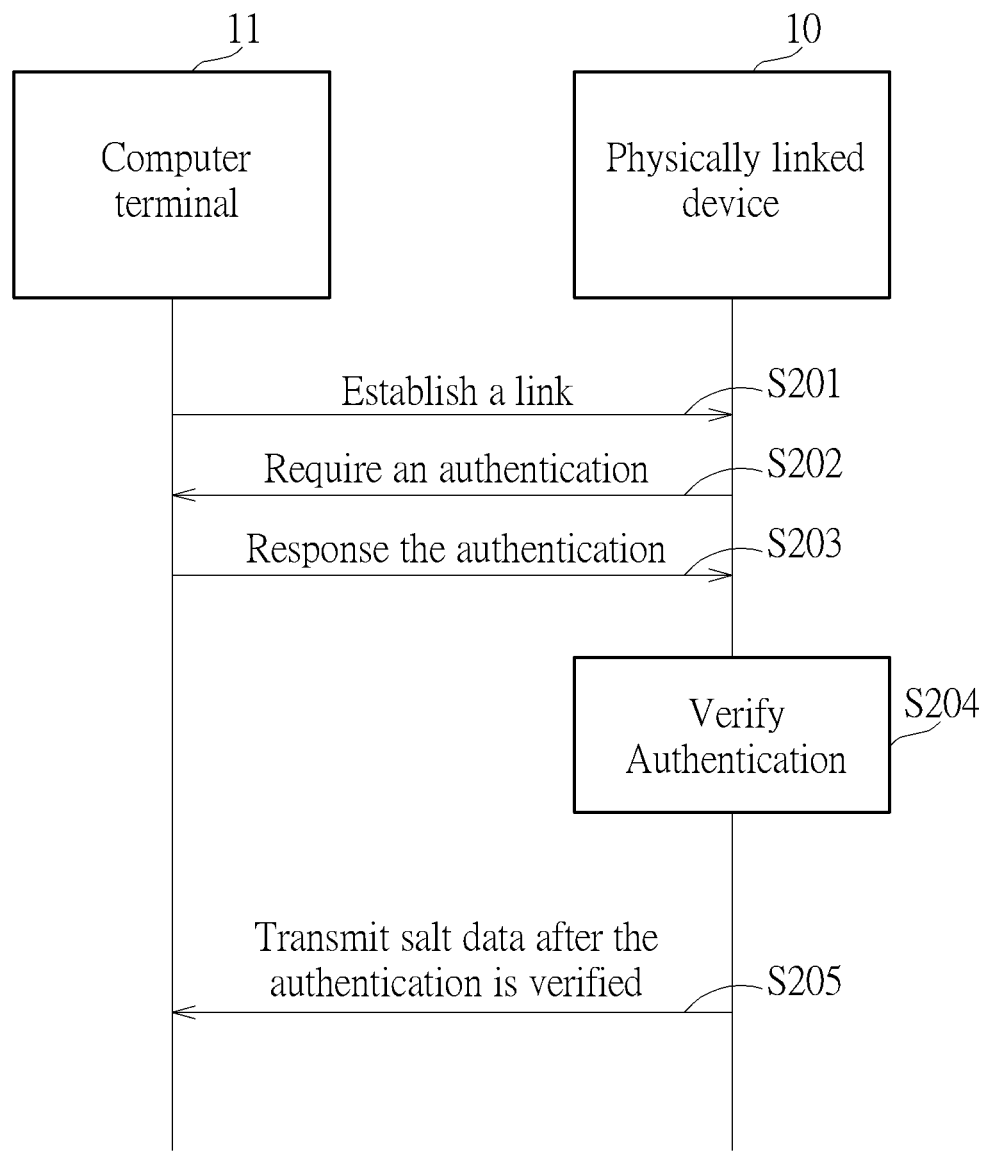
FIG. 2 is an illustration of verifying an authentication process in a first mode of the dynamic command protection system in FIG. 1.
Figure 3:
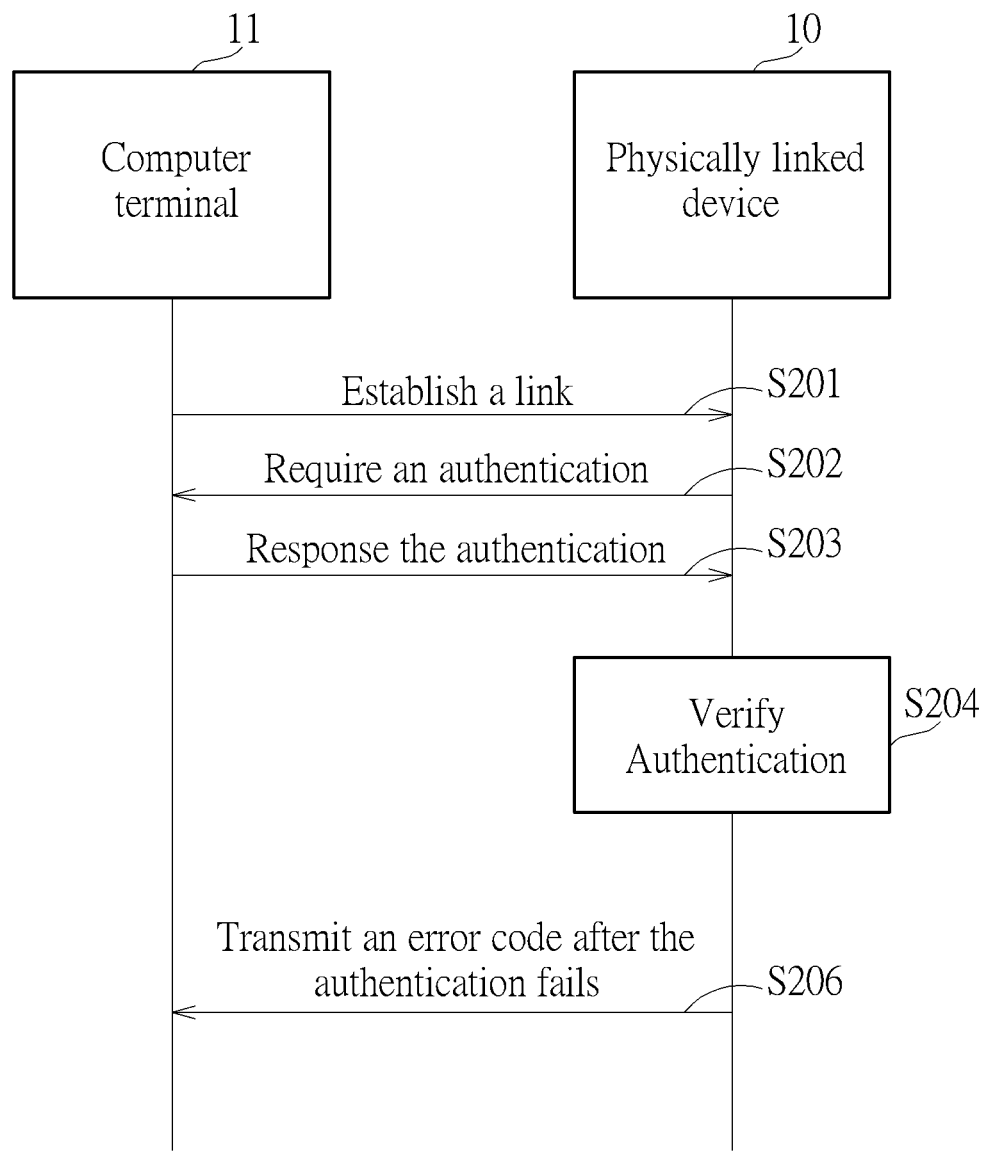
FIG. 3 is an illustration of verifying the authentication process in a second mode of the dynamic command protection system in FIG. 1.

FIG. 2 is an illustration of verifying an authentication process in a first mode of the dynamic command protection system 100. FIG. 3 is an illustration of verifying the authentication process in a second mode of the dynamic command protection system 100. In FIG. 2, a link is established between the computer terminal 11 and the physically linked device 10 in step S201. Then, the physically linked device 10 can transmit an authentication requirement signal to the computer terminal 11 in step S202. The computer terminal 11 responds an authentication signal to the physically linked device 10 in step S203. Then, the physically linked device 10 verifies the authentication after a responded authentication signal is received by the physically linked device 10 in step S204. When the authentication of the physically linked device 10 is verified, the physically linked device 10 can generate salt data.

Here, the salt data is only dedicated for current time session. Then, the salt data can be transmitted from the physically linked device 10 to the computer terminal 11 in step S205. Conversely, in FIG. 3, when the authentication fails (i.e., invalid), the physically linked device 10 can generate an error code. Then, the error code can be transmitted from the physically linked device 10 to the computer terminal 11 in step S206. FIG. 2 and FIG. 3 can be regarded as a pre-processing mechanism for protecting data commands.

Figure 4:
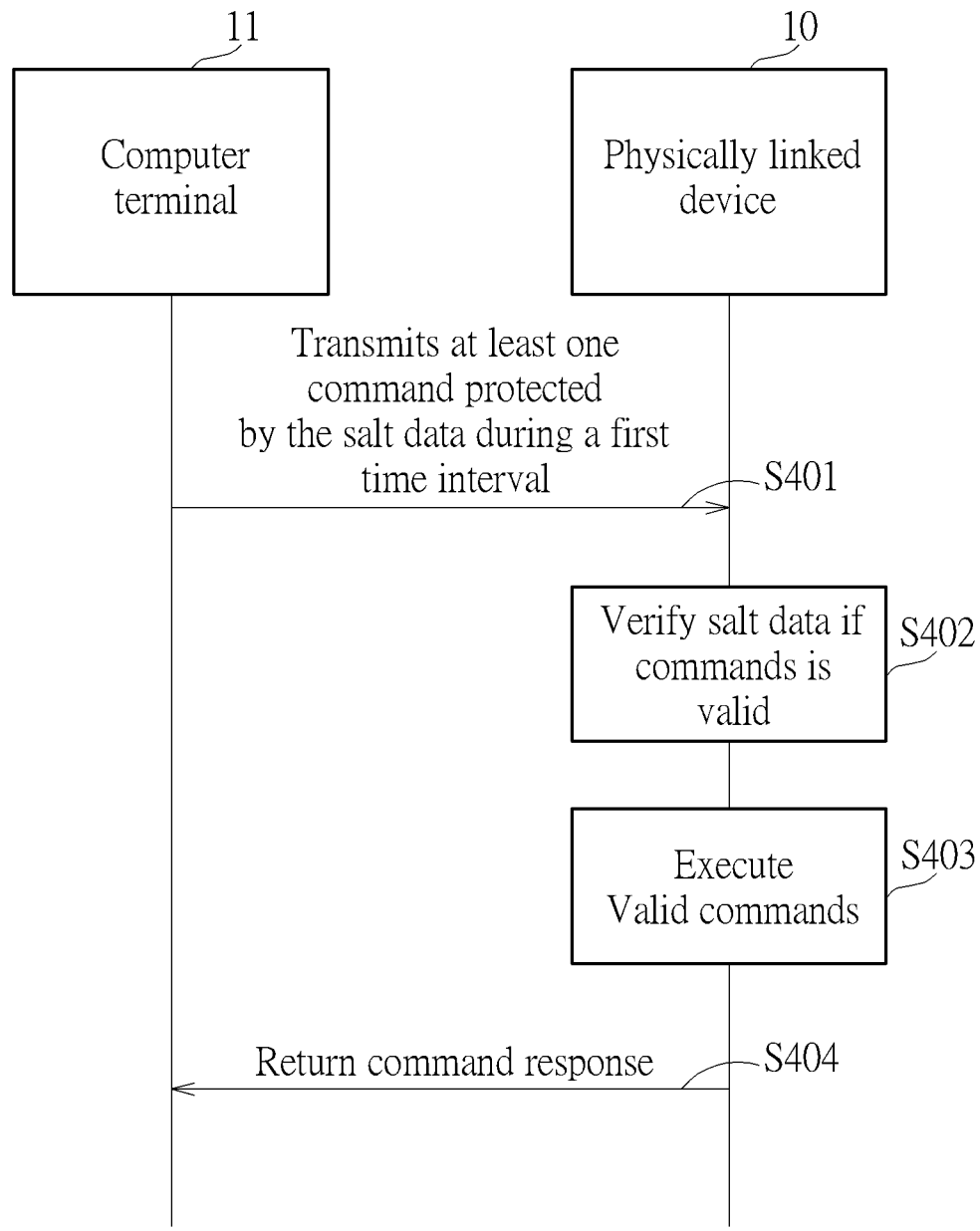
FIG. 4 is an illustration of verifying salt data and commands in a first mode of the dynamic command protection system in FIG. 1.
Figure 5:
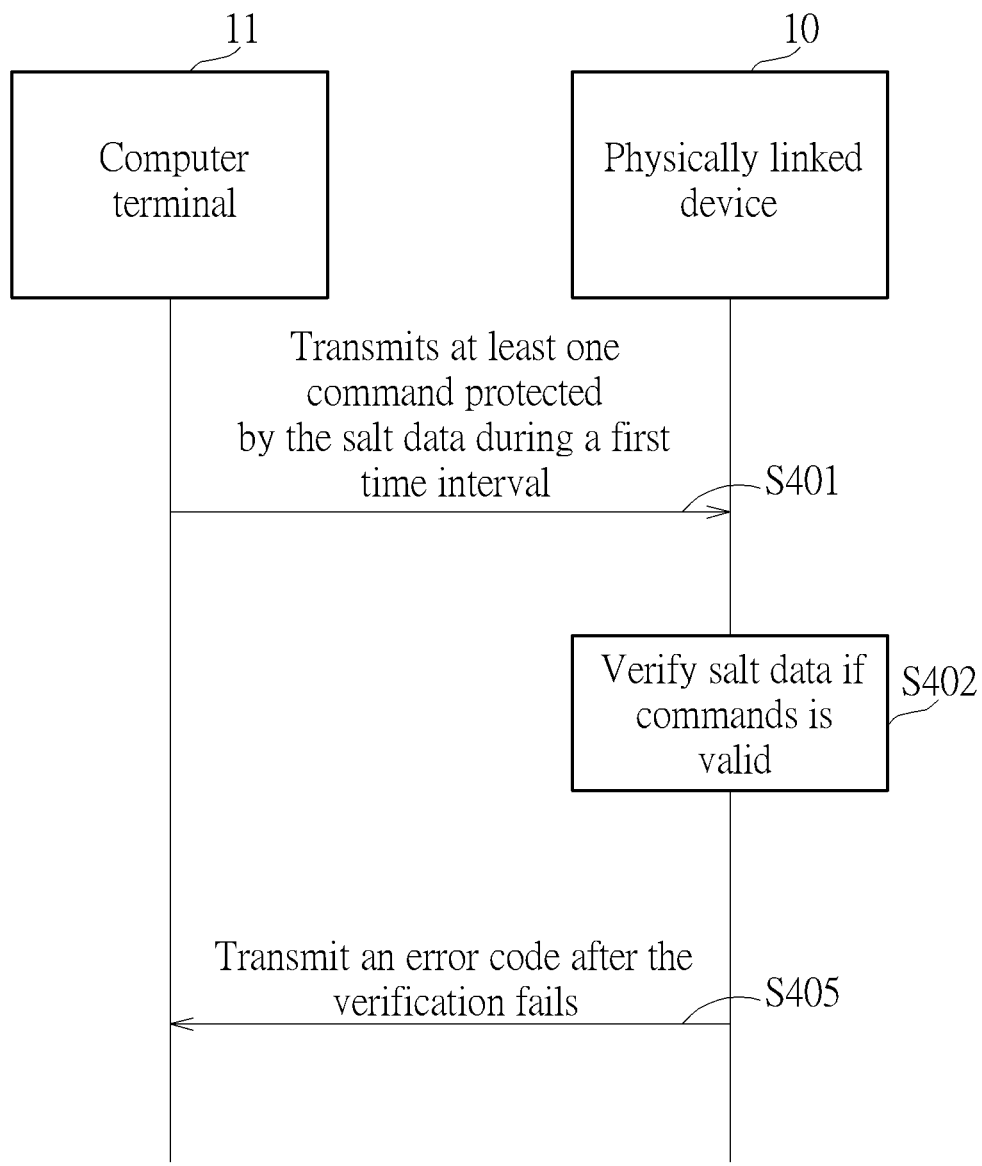
FIG. 5 is an illustration of verifying the salt data and commands in a second mode of the dynamic command protection system in FIG. 1.

FIG. 4 is an illustration of verifying the salt data and commands in a first mode of the dynamic command protection system 100. FIG. 5 is an illustration of verifying the salt data and commands in a second mode of the dynamic command protection system 100. As previously mentioned, the salt data can be transmitted from the physically linked device 10 to the computer terminal 11. Then, the computer terminal 11 can transmit at least one command protected by the salt data to the physically linked device during a first time interval in step S401. Here, the "salt data" can be defined as the key for protecting commands, such as the scramble seed. As previously mentioned, the salt data is bound to the current device and current time session. Once the at least one command is modulated with the salt data, the at least one command can be protected. The first time interval can be defined as the operation duration between a turn-on state and a turn-off state of the physically linked device 10. Then, the physically linked device 10 can verify the salt data if the at least one command is valid in step S402. In practice, the at least one command can be combined with the salt data as a packet by using an encoding mechanism such as a hash encoding mechanism. Then, the packet including the at least one command and the salt data can decoded by the physically linked device 10. Further, the salt data can be extracted for determining if the at least one command is executed. The physically linked device 10 can execute at least one valid command after the salt data is successfully verified in step S403. Then, the physically linked device 10 can generate a command response. The command response can be transmitted from the physically linked device 10 to the computer terminal 11. Here, the "command" can be any function performed by the physically linked device 10, such as a phone call function or an image capturing function. After the at least one valid command is executed, the physically linked device 10 can generate a command response. Then, the command response can be transmitted from the physically linked device 10 to the computer terminal 11 in step S404. Conversely, when the at least one command is invalid or a verification of the salt data fails in step S402, the physically linked device 10 can generate an error code. Then, the error code can be transmitted from the physically linked device 10 to the computer terminal 11 in step S405. FIG. 4 and FIG. 5 can be regarded as a main-processing mechanism for protecting data commands.

Figure 6:
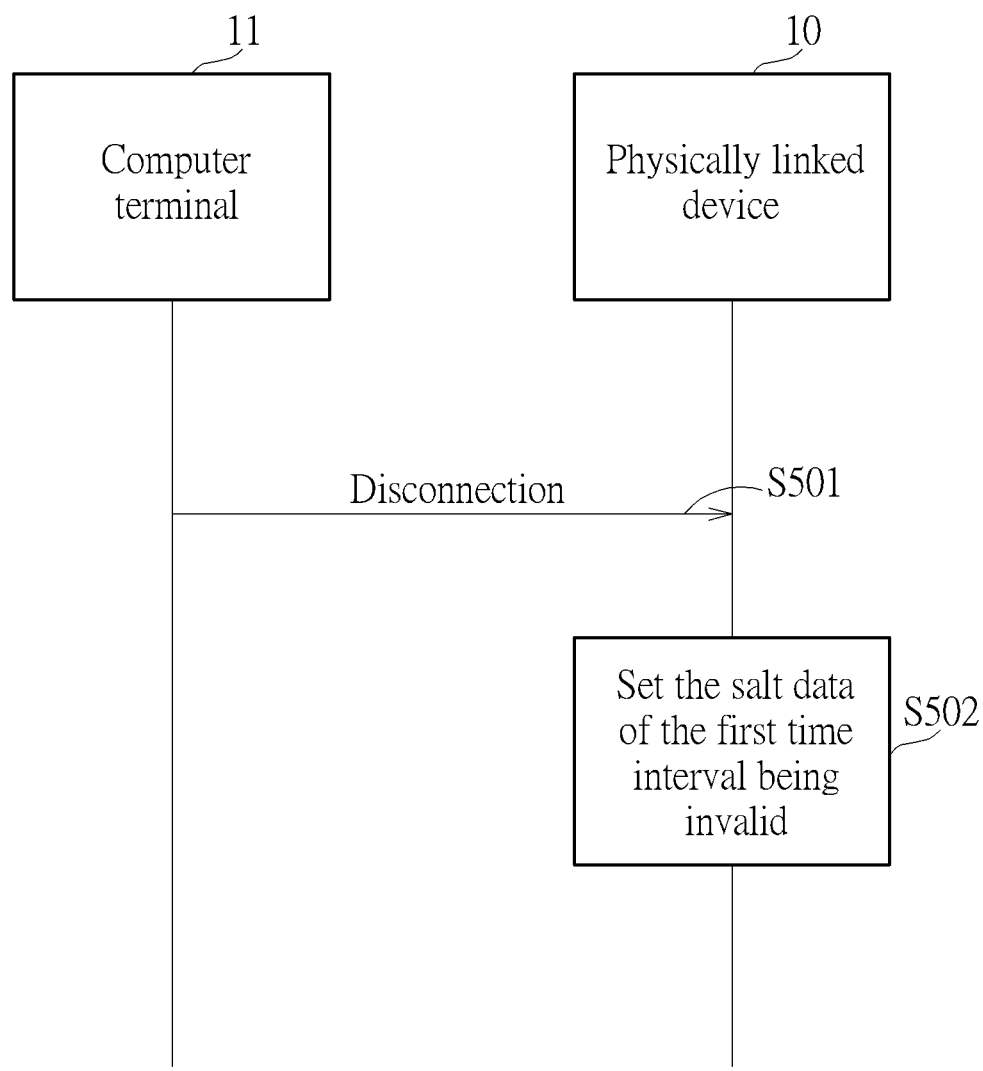
FIG. 6 is an illustration of setting the salt data of a first time interval to be invalid in a first mode of the dynamic command protection system in FIG. 1.
Figure 7:
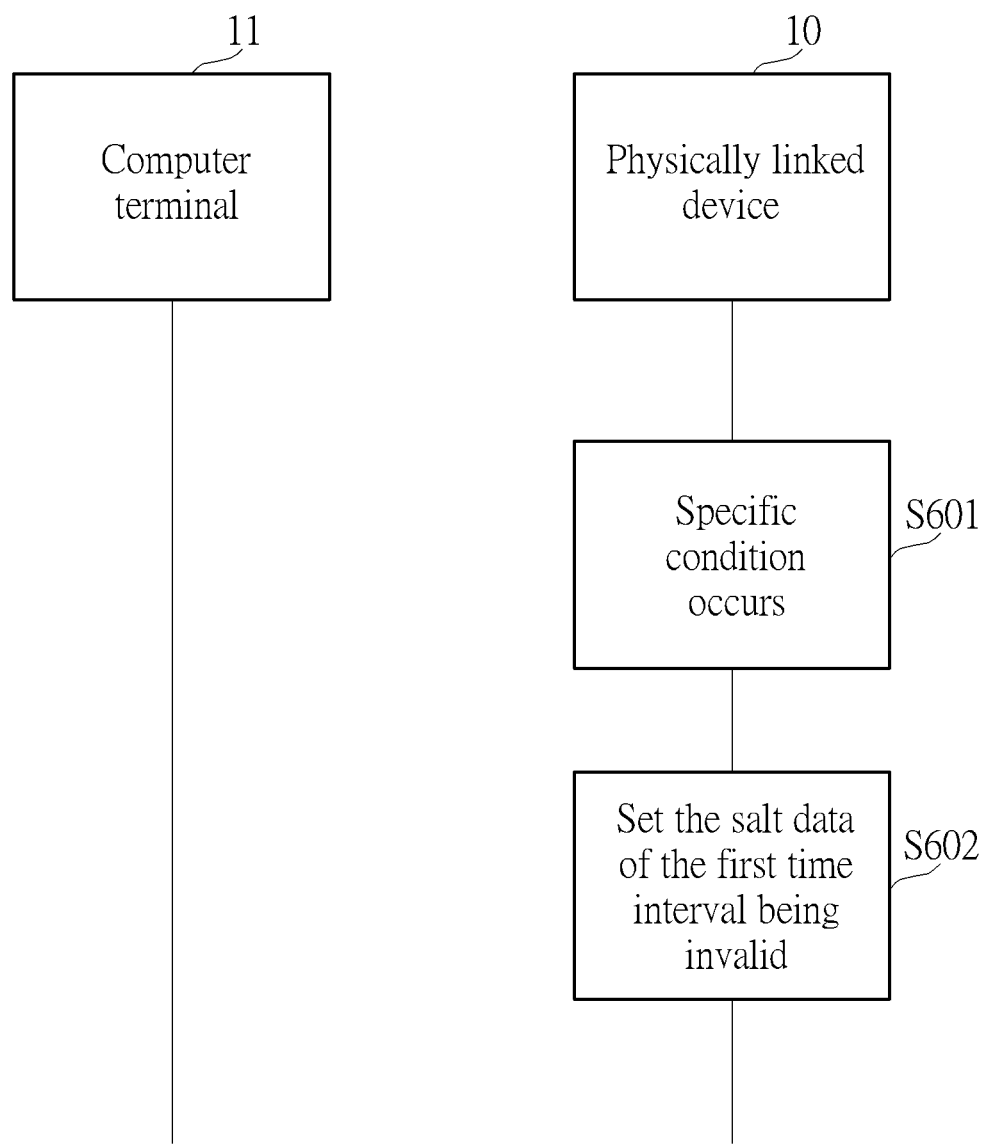
FIG. 7 is an illustration of setting the salt data of the first time interval to be invalid in a second mode of the dynamic command protection system in FIG. 1.

FIG. 6 is an illustration of setting the salt data of the first time interval to be invalid in a first mode of the dynamic command protection system 100. FIG. 7 is an illustration of setting the salt data of the first time interval to be invalid in a second mode of the dynamic command protection system 100. In FIG. 6, after the first time interval elapses, a link between the computer terminal 11 and the physically linked device 10 is disconnected in step S501. After the link between the computer terminal 11 and the physically linked device 10 is disconnected, the physically linked device 10 can reset the salt data for updating the salt data. For example, the physically linked device 10 can set the salt data of the first time interval to be invalid in step S502. Once the salt data of the first time interval is invalid, the invalid salt data is useless. In other embodiments, the physically linked device 10 can detect if a specific condition occurs in step S601. If the specific condition occurs, the physically linked device 10 can set the salt data of the first time interval to be invalid in step S602. For example, the physically linked device 10 can detect if no command is received over a predetermined time limit. If no command is received by the physically linked device 10 for a long time, the physically linked device 10 can set the salt data as invalid salt data. The link between the computer terminal 11 and the physically linked device 10 can be disconnected. Therefore, the invalid salt data cannot be used for modulating with the at least one command again. Further, in FIG. 6 and FIG. 7, after the salt data is set as invalid salt data, the physically linked device 10 can generate new salt data for updating the original salt data. Specifically, the new salt data can be used for a second interval. In other words, the original salt data is used during the first time interval. The updated salt data is used during the second time interval. The original salt data and the updated salt data are different. The first time interval and the second time interval are non-overlapped.

Figure 8:
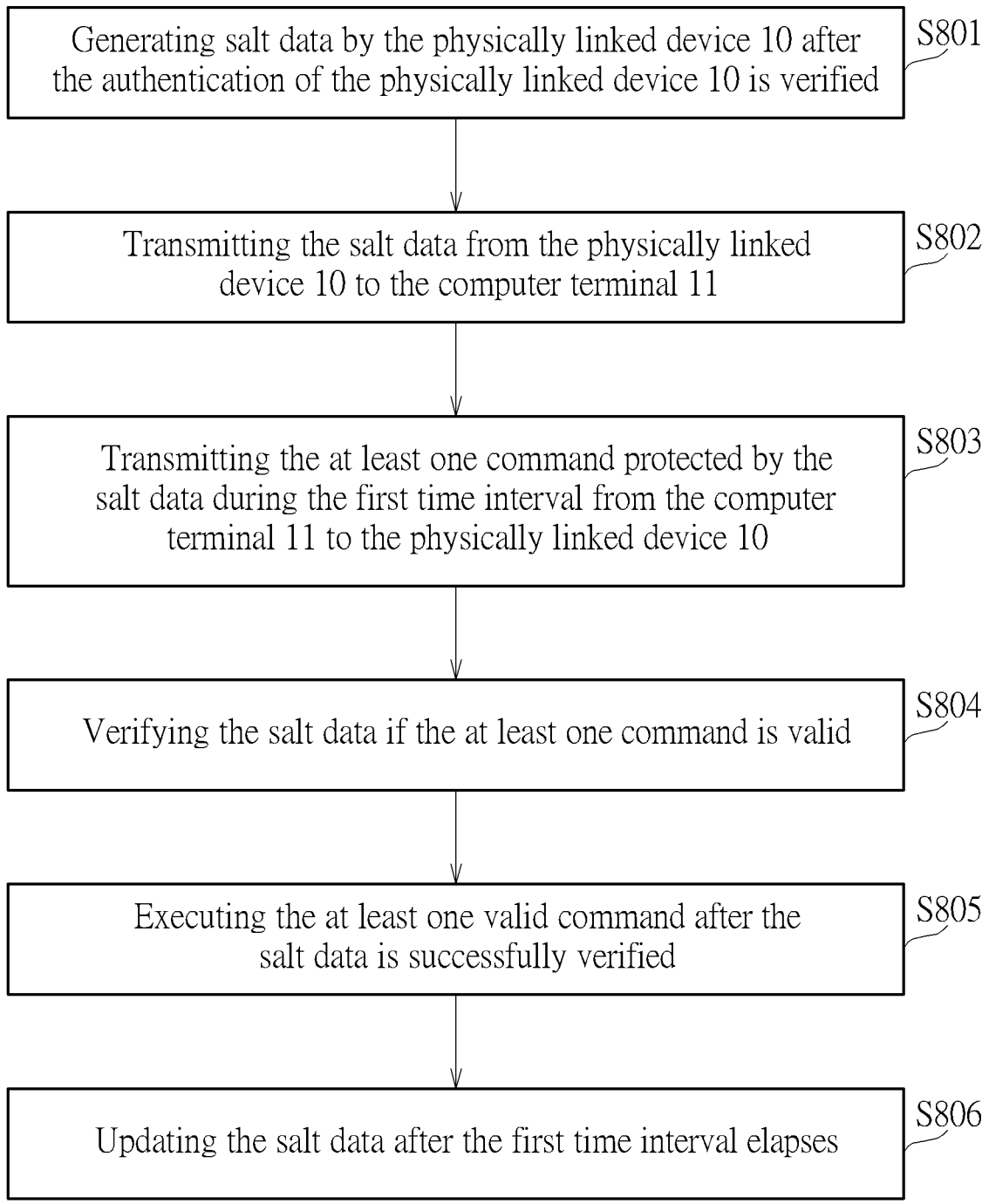
FIG. 8 is a flow chart of performing a dynamic command protection method by the dynamic command protection system in FIG. 1.

FIG. 8 is a flow chart of performing a dynamic command protection method by the dynamic command protection system 100. The dynamic command protection method includes step S801 to step S806. Any reasonable technology modification falls into the scope of the present invention. Step S801 to step S806 are illustrated below.

Step S801: generating salt data by the physically linked device 10 after the authentication of the physically linked device 10 is verified;

Step S802: transmitting the salt data from the physically linked device 10 to the computer terminal 11;

Step S803: transmitting the at least one command protected by the salt data during the first time interval from the computer terminal 11 to the physically linked device 10;

Step S804: verifying the salt data if the at least one command is valid;

Step S805: executing the at least one valid command after the salt data is successfully verified;

Step S806: updating the salt data after the first time interval elapses.

Details of step S801 to step S806 are previously illustrated. Thus, they are omitted here. In the dynamic command protection system 100, since the salt data can be used for protecting the at least one command by modulating with the at least one command, the information security can be improved. Further, since the salt data can be updated over time, even if the at least one command is recorded by hackers, the at least one command can also be protected by the updated salt data.

To sum up, the present invention discloses a dynamic command protection method and a dynamic command protection system. The dynamic command protection system can use salt data for protecting at least one command. Specifically, the salt data is bound to a physically linked device and is generated according to a time-varying value. The time-varying value can be an output of a runtime counter. Therefore, the salt data can be updated over time. In other words, once a current time interval elapses, the current salt data is invalid. Since the salt data can be updated over time, even if the at least one command is recorded by hackers, the at least one command can also be protected by the updated salt data. By doing so, the dynamic command protection system 100 can provide a robust command protection capability.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dynamic command protection method comprising:
   generating salt data by a physically linked device after an authentication of the physically linked device is verified;
   transmitting the salt data from the physically linked device to a computer terminal;
   transmitting at least one command protected by the salt data during a first time interval from the computer terminal to the physically linked device;
   verifying the salt data if the at least one command is valid;
   executing at least one valid command after the salt data is successfully verified;
   disconnecting a link between the computer terminal and the physically linked device after the first time interval elapses; and
   resetting the salt data by the physically linked device for updating the salt data after the link between the computer terminal and the physically linked device is disconnected;
   wherein the salt data is bound to the physically linked device and is generated according to a time-varying value.

2. The method of claim 1, further comprising:
   establishing the link between the computer terminal and the physically linked device before the link between the computer terminal and the physically linked device is disconnected;
   transmitting an authentication requirement signal from the physically linked device to the computer terminal;
   responding an authentication signal to the physically linked device by the computer terminal; and
   verifying the authentication by the physically linked device after a responded authentication signal is received by the physically linked device.

3. The method of claim 2, further comprising:
   returning an error code from the physically linked device to the computer terminal when the authentication fails.

4. The method of claim 1, wherein the physically linked device has a unique identification code, and the time-varying value is an output of a runtime counter.

5. The method of claim 1, further comprising:
   returning an error code from the physically linked device to the computer terminal when the at least one command is invalid or a verification of the salt data fails.

6. The method of claim 1, wherein the salt data is used during the first time interval, the updated salt data is used during a second time interval, the salt data and the updated salt data are different, and the first time interval and the second time interval are non-overlapped.

7. The method of claim 1, further comprising:
   detecting if a specific condition occurs; and
   setting the salt data of the first time interval to be invalid when the specific condition occurs.

8. The method of claim 7, wherein detecting if the specific condition occurs is detecting if no command is received by the physically linked device over a predetermined time limit.

9. A dynamic command protection system comprising:
   a physically linked device; and
   a computer terminal linked to the physically linked device;
   wherein the physically linked device generates salt data after an authentication of the physically linked device is verified, the physically linked device transmits the salt data to the computer terminal, the computer terminal transmits at least one command protected by the salt data to the physically linked device during a first time interval, the physically linked device verifies the salt data if the at least one command is valid, the physically linked device executes at least one valid command after the salt data is successfully verified, a link between the computer terminal and the physically linked device is disconnected after the first time interval elapses, the physically linked device resets the salt data for updating the salt data after the link between the computer terminal and the physically linked device is disconnected, and the salt data is bound to the physically linked device and is generated according to a time-varying value.

10. The system of claim 9, wherein the link is established between the computer terminal and the physically linked device before the link between the computer terminal and the physically linked device is disconnected, the physically linked device transmits an authentication requirement signal to the computer terminal, the computer terminal responds an authentication signal to the physically linked device, and the physically linked device verifies the authentication after a responded authentication signal is received by the physically linked device.

11. The system of claim 10, wherein the physically linked device returns an error code to the computer terminal when the authentication fails.

12. The system of claim 9, wherein the physically linked device has a unique identification code, and the time-varying value is an output of a runtime counter.

13. The system of claim 9, wherein the physically linked device returns an error code to the computer terminal when the at least one command is invalid or a verification of the salt data fails.

14. The system of claim 9, wherein the salt data is used during the first time interval, the updated salt data is used during a second time interval, the salt data and the updated salt data are different, and the first time interval and the second time interval are non-overlapped.

15. The system of claim 9, wherein the physically linked device detects if a specific condition occurs, and the physically linked device sets the salt data of the first time interval to be invalid when the specific condition occurs.

16. The system of claim 15, wherein the physically linked device detects if no command is received over a predetermined time limit.

* * * * *